(12) United States Patent
Cho (10) Patent No.: US 9,640,098 B2
(45) Date of Patent: May 2, 2017

(54) IMAGE DISPLAY DEVICE (71) Applicant: LG ELECTRONICS INC., Seoul (KR)

(72) Inventor: Hyunkyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 171 days.

(21) Appl. No.: 14/561,647

(22) Filed: Dec. 5, 2014

(65) Prior Publication Data

US 2015/0228213 A1   Aug. 13, 2015

(30) Foreign Application Priority Data

Feb. 12, 2014   (KR) .................. 10-2014-0016114

(51) Int. Cl.
| | |
|---|---|
| *G09G 3/00* | (2006.01) |
| *G01J 3/50* | (2006.01) |
| *G09G 3/20* | (2006.01) |
| *G09G 5/14* | (2006.01) |
| *H04N 17/04* | (2006.01) |
| *G01J 3/02* | (2006.01) |
| *G06F 1/16* | (2006.01) |
| *H04N 21/422* | (2011.01) |

(52) U.S. Cl.
CPC ............ *G09G 3/006* (2013.01); *G01J 3/0237* (2013.01); *G01J 3/506* (2013.01); *G09G 3/2092* (2013.01); *G09G 5/14* (2013.01); *H04N 17/04* (2013.01); *G06F 1/1601* (2013.01); *G09G 2320/0242* (2013.01); *G09G 2320/0613* (2013.01); *G09G 2320/0666* (2013.01); *G09G 2320/0673* (2013.01); *G09G 2320/0686* (2013.01); *G09G 2320/0693* (2013.01); *G09G 2360/145* (2013.01); *H04N 21/42202* (2013.01)

(58) Field of Classification Search
CPC ... G09G 2320/0242; G09G 2320/0666; G09G 2320/0673
See application file for complete search history.

(56) References Cited

U.S. PATENT DOCUMENTS 6,271,825 B1   8/2001   Greene et al.
7,633,550 B1   12/2009  Starr et al.
(Continued)

FOREIGN PATENT DOCUMENTS

| EP | 2 722 836 A1 | 4/2014 |
| JP | 2002-098641 A | 4/2002 |
| WO | WO 2012/172707 A1 | 12/2012 |

OTHER PUBLICATIONS

European Search Report issued in Application No. 15152448.5 dated May 8, 2015.
(Continued)

*Primary Examiner* — Shaheda Abdin
(74) *Attorney, Agent, or Firm* — KED & Associates LLP (57) ABSTRACT

An image display device comprises a display panel, a casing to hold the display panel, a moving bar provided at the casing and configured to be movable in a first direction while overlapping the display panel, a calibration sensor at the moving bar to be movable in a second direction perpendicular to the first direction and to obtain calibration information related to the display panel, and a controller to control the display panel based on the obtained calibration information.

18 Claims, 6 Drawing Sheets

(56) References Cited

U.S. PATENT DOCUMENTS

2004/0114041 A1* 6/2004 Doyle ................... G01J 3/46
                                                    348/182
2005/0190136 A1    9/2005  Edelbrock
2007/0120763 A1    5/2007  De Paepe et al.
2008/0294298 A1   11/2008  Park
2014/0091210 A1    4/2014  Hogo et al.

OTHER PUBLICATIONS

European Office Action dated Mar. 15, 2016 issued in Application No. 15152448.5.
European Search Report dated Sep. 30, 2015 issued in Application No. 15152448.5.

* cited by examiner

IMAGE DISPLAY DEVICE

CROSS-REFERENCE TO RELATED APPLICATION

Pursuant to 35 U.S.C. §119(a), this application claims the benefit of earlier filing date and right of priority to Korean Application No. 10-2014-0016114, filed on Feb. 12, 2014, the contents of which is incorporated by reference herein in its entirety.

BACKGROUND

1. Field of the Invention

The present invention relates to an image display device with a calibration sensor.

2. Description of the Conventional Art

Image display devices include every device that receives and outputs a broadcast, or records and plays video or audio. Examples of this image display device include a television, a monitor, a projector, a tablet, etc.

As the functions of image display devices are diversified, they are being implemented in the form of a multimedia player equipped with complex functions, such as photographing and video capturing functions, gaming functions, broadcast reception functions, as well as broadcast outputting functions and video playback functions.

Various novel attempts have been made in terms of hardware or software to support and increase the functionality of such image display devices.

The color, brightness, and saturation of a display panel for an image display device can change slightly over time. Even minor differences among types of hardware or software may cause subtle differences in color on the same display panel. Accordingly, these factors should be adjusted for the display panel to produce the best color possible.

The adjustment is made by resetting control signals for the display panel based on values detected by an optical sensor such as a calibration sensor. The principle of calibration is widely known in the art.

SUMMARY OF THE INVENTION

An aspect of the present invention is to provide an image display device capable of calibrating a certain area of a display panel using a built-in calibration sensor.

In order to accomplish this aspect of the present invention, there is provided an image display device according to an embodiment of the present invention, the image display device including: a display panel that outputs visual information; a casing that holds the display panel; a moving bar that is mounted on the casing and configured to be movable in a first direction while overlapping the display panel; a calibration sensor that is mounted at the moving bar so as to be movable in a second direction perpendicular to the first direction and obtains calibration information for the display panel; and a controller that controls the display panel using the obtained calibration information.

The moving bar is configured to be held in a holder portion provided on one side of the display panel.

The holder portion may be placed at the lower edge of the display panel, and the moving bar may be configured to be movable from the lower edge of the display panel to the upper edge.

The casing and the moving bar may lie in a plane perpendicular to the display panel while the moving bar is held in the holder portion.

The calibration sensor is configured to face the display panel, and a shielding wall protruding toward the display panel is formed on the moving bar so that ambient light is shielded when the calibration sensor obtains calibration information.

The shielding wall may extend along the circumference of the moving bar so as to surround the calibration sensor.

A lead screw with a thread on the outer circumference may be placed on at least one side of the casing to extend along the side of the casing and rotate by a driving unit, and the moving bar may be screwed to the lead screw and move in the first direction as the lead screw turns.

The moving bar comprises: a lead screw with a thread on the outer circumference that extends in the lengthwise direction of the moving bar; a driving unit that turns the lead screw; and a moving member where the calibration sensor is mounted and which is screwed to the lead screw and moves in the second direction as the lead screw turns.

The calibration sensor may be configured to be movable toward a certain area once the moving member is placed on the certain area.

The display panel is divided into a plurality of screen regions that output different information, and the controller controls the position of the calibration sensor to obtain calibration information for each of the screen regions.

The controller may control the position of the calibration sensor so that the calibration sensor is positioned sequentially in the divided regions.

The controller may do a calculation on the central area of each of the screen regions and position the calibration sensor in each central area.

If another screen region is positioned within one of the screen regions, the controller may divide the rest of the screen region, excluding the another screen region, into a plurality of sub regions, do a calculation on the central area of one of the divided sub regions, and position the calibration sensor in the central area.

The one of the divided sub regions may be the largest.

The image display device further includes a memory unit that contains calibration information optimized for each screen mode, and the controller controls the display panel through a comparative analysis of the obtained calibration information and the optimized calibration information.

The optimized calibration information may include color temperature information and gamma value information.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

An image display device related to the present invention includes every device equipped with a display panel, such as a device for receiving and outputting broadcasts, a device for playing back videos, etc. Hereinafter, the image display device related to the present invention will be described taking a television as an example.

Figure 1:
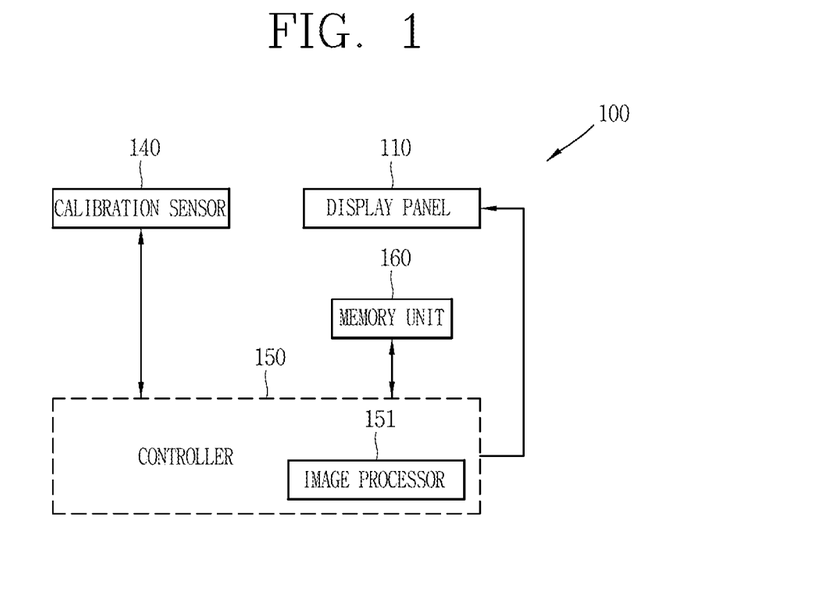
FIG. 1 is a block diagram for explaining a calibration process of an image display device related to the present invention.

FIG. 1 is a block diagram for explaining a calibration process of an image display device 100 related to the present invention.

Referring to FIG. 1, the image display device 100 includes a display panel 110 that outputs visual information, a calibration sensor 140 that obtains calibration information for the display panel 110, a controller 150 with an image processor 151, and a memory unit 160 that stores calibration information. Other components of the image display device 100 are not directly related to the following description, so they will be omitted.

When a control command associated with calibration is issued, the calibration sensor 140 obtains calibration information for (e.g., the color, brightness, saturation, etc of) the display panel 110. The calibration sensor 140 may be placed in a certain area of the display panel 110 and obtain calibration information by a mechanism to be described later.

The memory unit 160 stores calibration information optimized for the display panel 110. The optimized calibration information may include calibration information optimized for each screen mode (e.g., video playback mode, text output mode, search mode, etc). Such optimized calibration information may include color temperature information and gamma value information which are optimized for each screen mode.

The controller 150 controls all the components including the calibration sensor 140. The image processor 151 provided in the controller 150 generates a control signal for controlling the display panel 100 by using calibration information.

Hereinafter, the image display device 100 capable of calibrating a certain area of the display panel 110 using the built-in calibration sensor 140 will be described in more detail.

Figure 2:
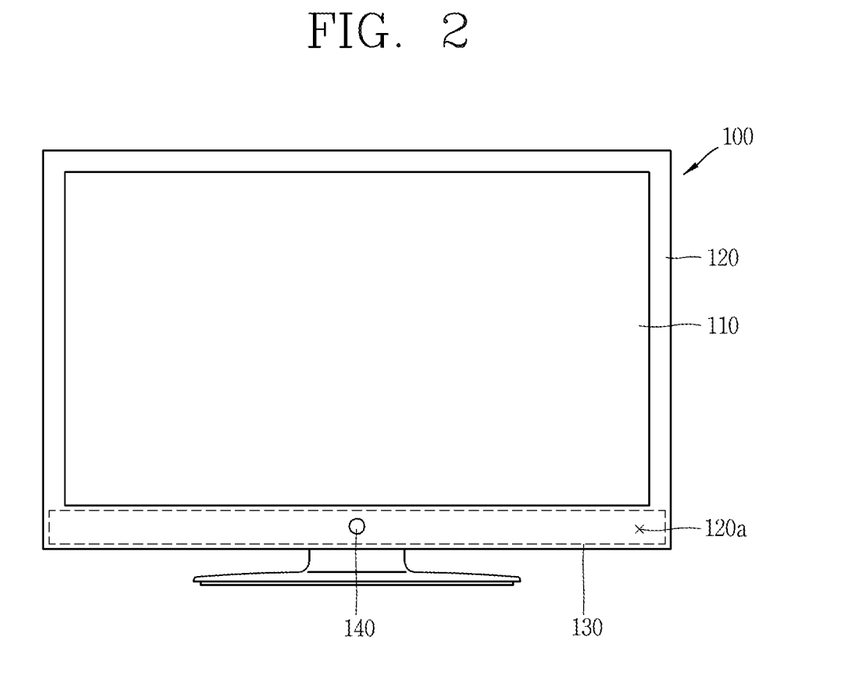
FIG. 2 is a conceptual diagram showing an example of the image display device related to the present invention.
Figure 3:
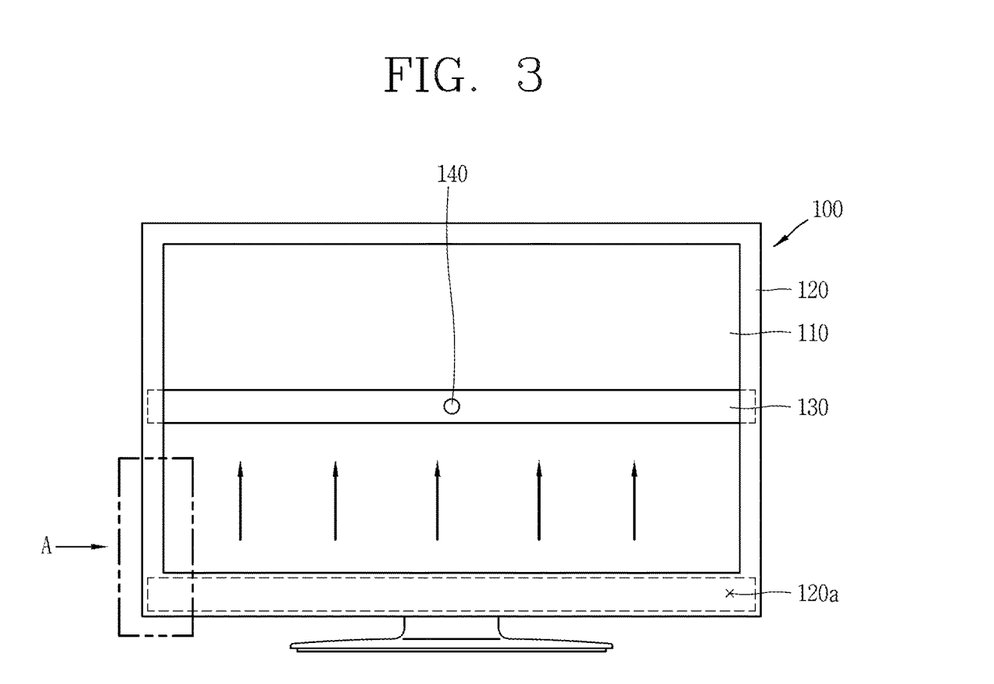
FIG. 3 is a conceptual diagram showing the moving bar of FIG. 2 moving in a first direction.
Figure 4:
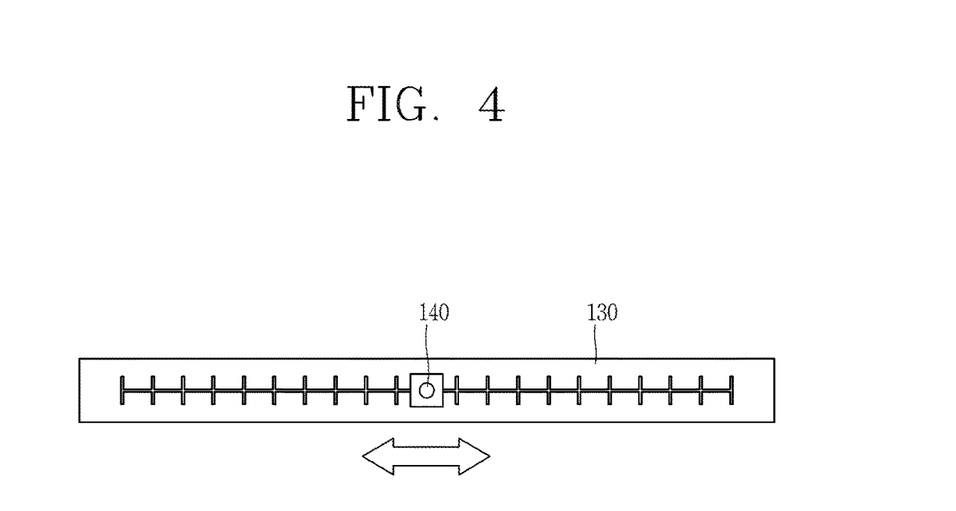
FIG. 4 is a conceptual diagram showing the calibration sensor of FIG. 2 moving in a second direction.

FIG. 2 is a conceptual diagram showing an example of the image display device related to the present invention. FIG. 3 is a conceptual diagram showing the moving bar 130 of FIG. 2 moving in a first direction. FIG. 4 is a conceptual diagram showing the calibration sensor 140 of FIG. 2 moving in a second direction.

Referring to FIGS. 2 to 4, the image display device 100 includes a display panel 110, a casing 120, a moving bar 130, a calibration sensor 140, and a controller 150.

The display panel 110 can convert a video signal, data signal, or OSD signal processed by the controller 150 into an RGB signal to generate a driving signal. By this, the display panel 110 outputs visual information.

The display panel 110 can be implemented in various forms, such as a plasma display panel PDP, a liquid crystal display LCD, a thin film transistor-liquid crystal display TFT-LCD, an organic light emitting diode OLED, a flexible display, a 3D display, an e-ink display, etc.

Moreover, the display panel 110 can be implemented as a touch screen by forming an interlayer with a touch sensor or by being integrated with it. This touch screen can function as a user input unit that provides an input interface between the image display device 100 and the user.

The casing 120 accommodates the display panel 110, and constitutes the appearance of the image display device 100. The casing 120 may be called other terms, like frame, housing, cover, and so on. As shown in the drawings, the casing 120 may be configured to cover the edge of the display panel 110.

The moving bar 130 is movably mounted on the casing 120. The moving bar 130 is in the shape of a bar that extends longitudinally towards both sides of the display panel 110. The moving bar 130 is configured to be movable in the first direction while overlapping the display panel 110. FIG. 2 illustrates that the moving bar 130 is arranged longitudinally in the transverse direction of the display panel 110 and movable between the upper and lower edges of the display panel 100.

The calibration sensor 140 is mounted at the moving bar 130 so as to be movable in a second direction perpendicular to the first direction and obtains calibration information for the display panel 110. FIG. 3 illustrates that the calibration sensor 140 is mounted to be movable along the direction of extension of the moving bar 130 and this results in making the display panel 100 movable to the left and right sides of the display panel 110.

According this structure, a certain area of the display panel 110 can be calibrated as the moving bar 130 is configured to be movable in the first direction while overlapping the display panel 110 and the calibration sensor 140 is mounted at the moving bar 130 so as to be movable in the second direction perpendicular to the first direction.

The controller 150 controls the display panel 110 using obtained calibration information. For example, the image processor provided in the controller 150 can do a comparative analysis of the optimized calibration information stored in the memory unit 160 and the calibration information obtained by the calibration sensor 140 and convert an RGB signal the display panel 110 receives.

A detailed structure for implementing this mechanism will be described in more detail below.

Figure 5A:
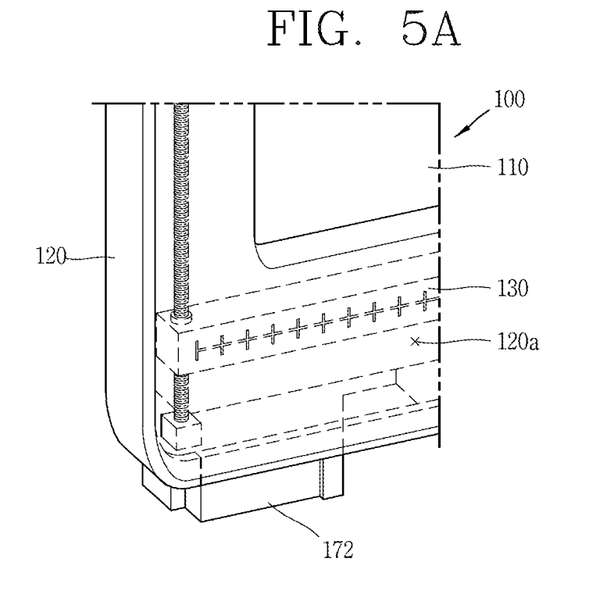
FIGS. 5A and 5B are conceptual diagrams showing the moving bar of FIG. 2 held in a holder portion and the moving bar of FIG. 2 being pulled out from the holder portion, respectively.
Figure 5B:
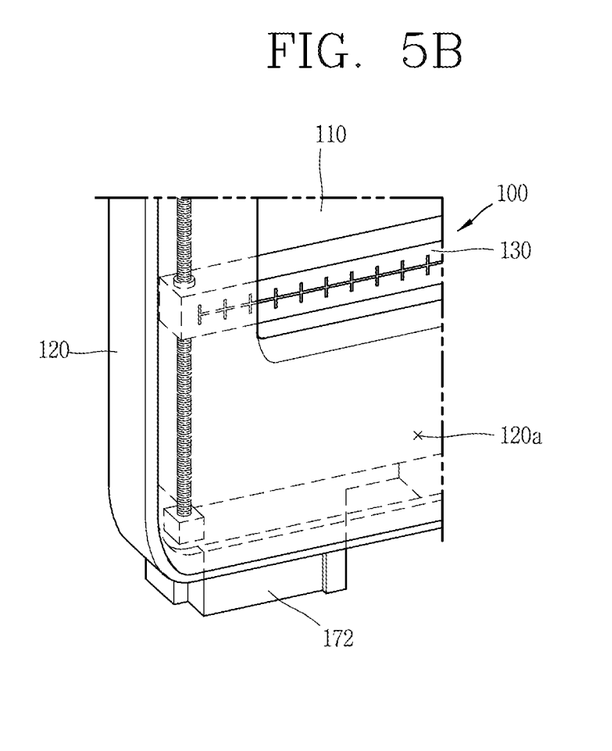
Figure 6:
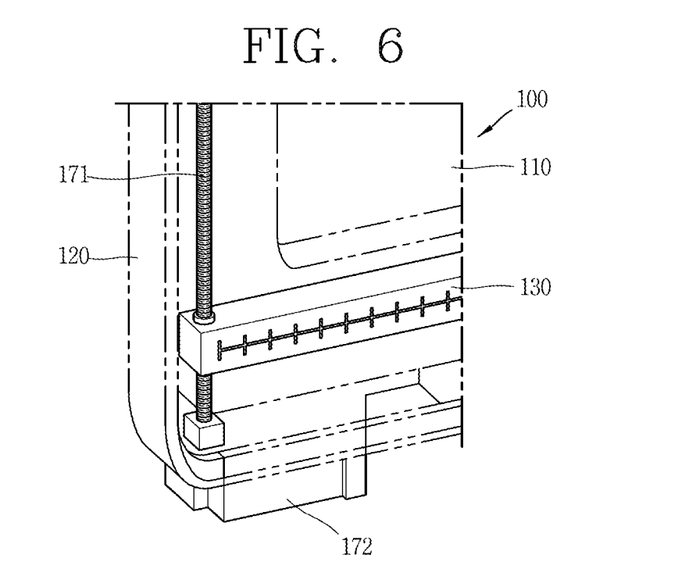
FIG. 6 is an enlarged view of the part A shown in FIG. 3.

FIGS. 5A and 5B are conceptual diagrams showing the moving bar 130 of FIG. 2 held in a holder portion 120a and the moving bar 130 of FIG. 2 being pulled out from the holder portion 120a, respectively. FIG. 6 is an enlarged view of the part A shown in FIG. 3.

First of all, referring to FIGS. 5A and 5B, the holder portion 120a for holding the moving bar 130 is provided on one side of the display panel 100. The holder portion 120a may be a space between the display panel 110 and the casing 120 or a space formed in the casing 120. Preferably, the moving bar 130 is held in the holder portion 120a so as not to cover the visual information output on the display panel 110 while calibration is not performed.

The casing 120 may be configured to cover the moving bar 130 to avoid the moving bar 130 from being visible on the front side of the display panel 110 when the moving bar 130 is held in the holder portion 120a. That is, the moving bar 130 is held in the holder portion 120a and covered and hidden by the casing 120.

As shown in FIG. 5A, the casing 120 and the moving bar 130 may lie in a plane perpendicular to the display panel 110 while the moving bar 130 is held in the holder portion 120a. Accordingly, no level difference occurs between the casing 12 and the moving bar 130 while the moving bar 130 is held, which smartens up the appearance.

The holder portion 120a may be provided on one side of the display panel 110. This drawing illustrates that the holder portion 120a is provided at the lower edge of the display panel 110 and the moving bar 130 is configured to move from the lower edge of the display panel 110 to the top edge. It is to be noted that the moving bar 130 can be configured to move from the upper edge of the display panel 110 to the lower edge.

Contrary to the above example, the moving bar 120a can also be provided on the top edge of the display panel 110. In this case, the controller 150 can control the movement of the moving bar 130 so that the moving bar 130 is held in the adjacent one of two holder portions 120a on either edge, after obtaining calibration information for a certain area of the display panel 110. Accordingly, calibration can be done faster.

Now, an example of a structure for moving the moving bar 130 and the calibration sensor 140 will be described.

Referring to FIG. 6, a lead screw 171 with a thread on the outer circumference is placed on at least one side of the casing 120 to extend along the side of the casing 120 and rotate by a driving unit 172. This drawing illustrates that the lead screw 171 is arranged longitudinally on the left side of the case 120 in the lengthwise direction of the display panel 110.

The moving bar 130 is screwed to the lead screw 171 and move as the lead screw 171 turns in the first direction. For example, when the lead screw 171 rotates in one direction, the moving bar 130 moves from the lower edge of the display panel 110 to the upper edge, and when the lead screw 171 rotates in the other direction, the moving bar 130 moves from the upper edge of the display panel 110 to the lower edge.

The above structure also may be provided symmetrically on the right side of the casing 120. Alternatively, a guide structure for guiding the movement of the moving bar 130 may be provided on the right side of the casing 120. In an example, a guide bar is longitudinally arranged on the right side of the casing 120 in the lengthwise direction of the display panel 110, and the right side of the moving bar 130 may be connected to the guide bar and guided during movement.

Figure 7:
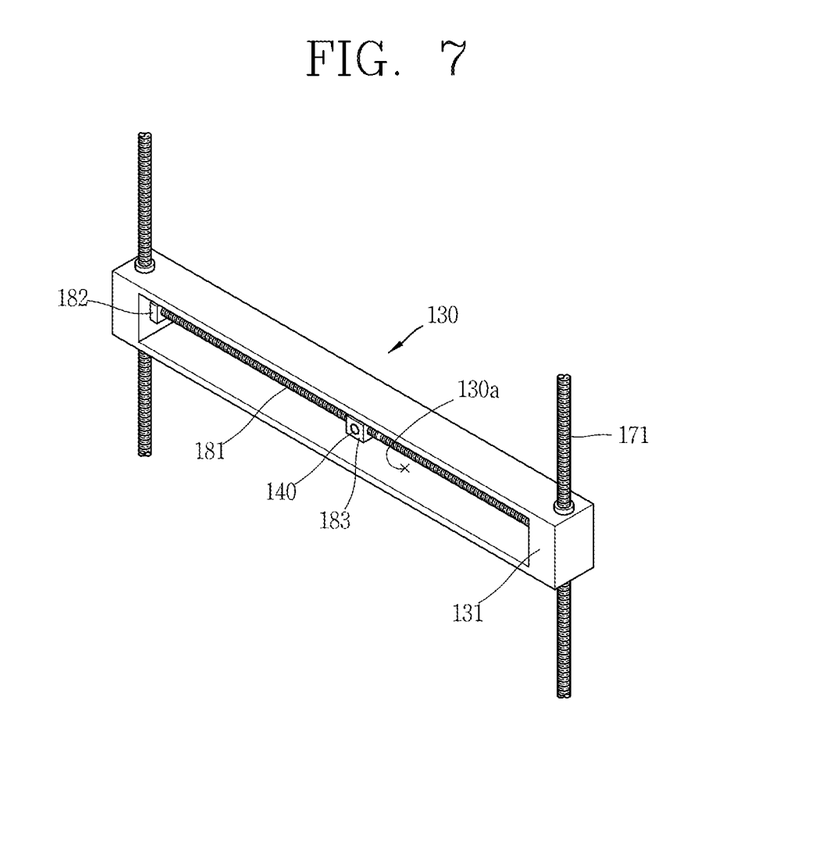
FIG. 7 is a conceptual diagram showing the inside of the moving bar of FIG. 2.

FIG. 7 is a conceptual diagram showing the inside of the moving bar 130 of FIG. 2.

Referring to FIG. 7, the calibration sensor 140 is configured to be held in the moving bar 130 and face the display panel 110. If ambient light enters during calibration, this makes it difficult to obtain accurate calibration information. A shielding wall 131 protruding toward the display panel 110 is formed on the moving bar 130 so that the ambient light is shielded when the calibration sensor 140 obtains calibration information. The shielding wall 131 may extend along the circumference of the moving bar 130 so as to surround the calibration sensor 140.

For improvement of shielding performance, the shielding wall 131 can maintain contact with the display panel 110 when the moving bar 130 moves. A protective sheet of fibrous material (e.g., non-woven fabric) can be attached to the shielding wall 131 in order to prevent scratches on the display panel 110 due to the contact of the shielding wall 131.

The moving bar 130 includes a holder portion 130a. A lead screw 181, driving unit 182, and moving member 183 can be mounted in the holder portion 130a to move the calibration sensor 140.

The lead screw 181 with a thread on the outer circumference is placed on the moving bar 130 to extend along the length of the moving bar 120 and rotate by the driving unit 182. Preferably, the lead screw 181 for moving the calibration sensor 140 is placed perpendicular to the lead screw 171 for moving the moving bar 130.

The calibration sensor 140 is mounted at the moving member 183, and the moving member 183 is configured to be screwed to the lead screw 181 movable in the second direction as the lead screw 181 rotates. That is, the moving member 183 moves from one side to the other side or vice versa according to the direction of rotation of the lead screw 181.

Meanwhile, the calibration sensor 140 may be configured to be movable toward a certain area once the moving member 183 is placed on the certain area. Also, this movement of the calibration sensor 140 may cause the calibration sensor 140 to come into contact with the display panel 110. To accomplish this, a driving unit for moving the calibration sensor 140 in a third direction perpendicular to the first and second directions may be mounted at the moving member 183. This allows for more accurate calibration.

The above-described structure for moving the moving bar 130 and the calibration sensor 140 is merely an example, and the present invention is not limited to this structure. Any modifications can be made to this structure for movement.

Examples of calibration using the above-explained calibration sensor 140 will be described below.

Figure 8:
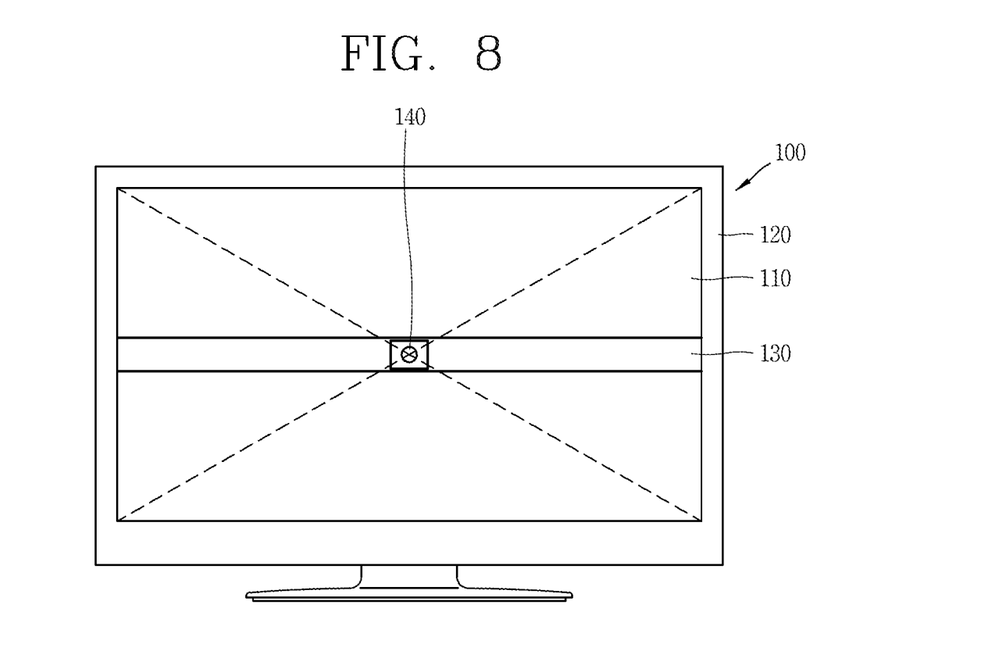
FIGS. 8 to 10 are conceptual diagrams showing examples of calibration in the image display device of FIG. 2.
Figure 9:
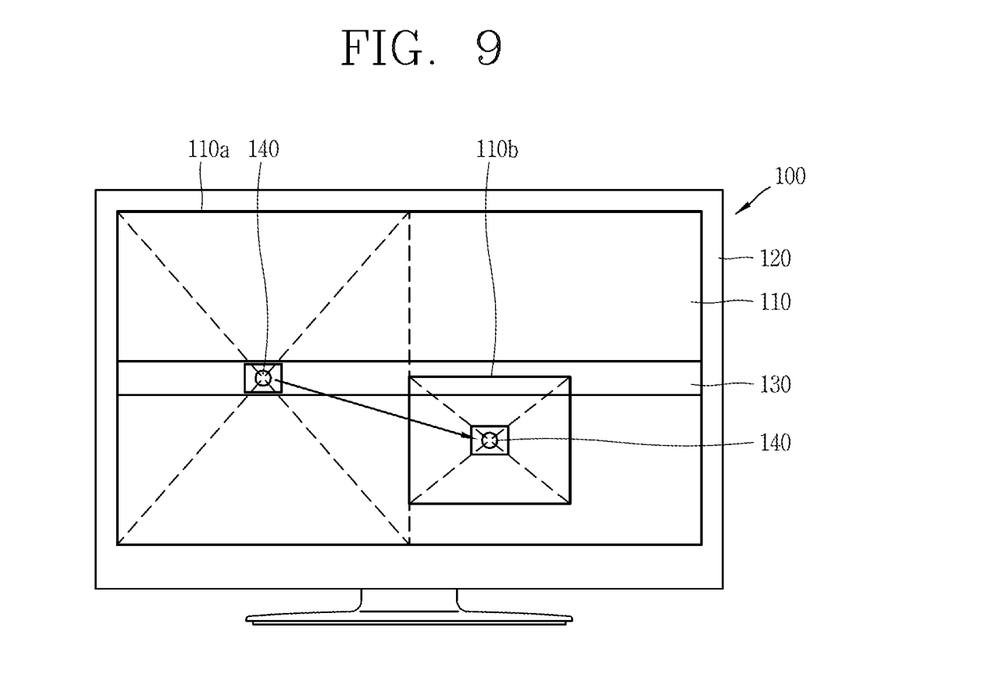
Figure 10:
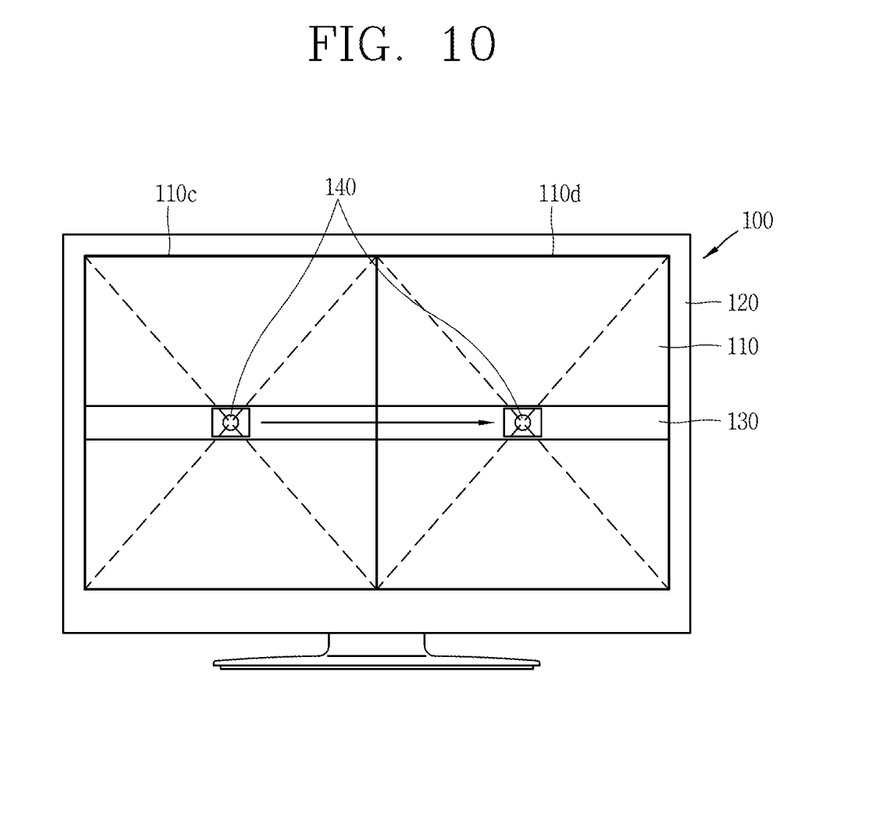

FIGS. 8 to 10 are conceptual diagrams showing examples of calibration in the image display device 100 of FIG. 2.

First of all, FIG. 8 illustrates that calibration is performed while the display panel 110 is outputting one piece of information.

In view of the uniformity of the display panel 110 (especially, liquid crystal display), the central area of the display panel 110 can be calibrated. Accordingly, as shown in this drawing, the controller 150 can do a calculation on the central area of the display panel 110 and position the calibration sensor 140 in the central area.

Meanwhile, the controller 150 can divide the display panel 110 into a plurality of regions and calibrate the divided regions. In this case, the controller 150 may control the position of the calibration sensor 140 so that the calibration sensor 140 is positioned sequentially in the divided regions. This allows for more accurate calibration of the display panel 110.

FIGS. 9 and 10 illustrate that calibration is performed after the display panel 110 is divided into a plurality of screen regions 100a and 110b; or 110c and 110d which output different information. FIG. 9 shows another screen region 110a which is positioned within one screen region 110a (PIP: Picture In Picture). FIG. 10 shows a plurality of screen regions 110c and 110d which are positioned left and right or up and down in such a way that they do not overlap each other.

The controller 150 can control the position of the calibration sensor 140 to obtain calibration information for each of the screen regions 110a and 110b; or 110c and 110d. The controller 150 may control the calibration sensor 140 so that the calibration sensor 140 is positioned sequentially in the screen regions 110a and 110b; or 110c and 110d according to a set criteria. For example, the calibration sensor 140 may be positioned in the screen regions 110a and 110b; or 110c and 110d from larger to smaller or from left to right. In this case, the controller 150 can do a calculation on the central area of each of the screen regions 110a and 110b; or 110c and 110d and position the calibration sensor 140 in each central area.

As shown in FIG. 9, if another screen region 110b is positioned within one screen region 110a, the controller 150 may divide the rest of the one screen region 110a, excluding the another screen region 110b, into a plurality of sub regions, do a calculation on the central area of one of the divided sub regions, and position the calibration sensor 140 in the central area.

The one of the divided sub regions may be the largest. This is to increase calibration efficiency by substantially calibrating the most noticeable region.

The criteria for division into a plurality of sub regions may vary according to the user settings. Besides, all of the divided sub regions may be sequentially calibrated for more accurate calibration.

The screen regions 110a and 110b; or 110c and 110d can be driven in different modes. For example, one screen region can be driven in video playback mode, and the other screen region can be driven in text output mode. The memory unit 160 can include calibration information optimized for each screen mode, and the controller 150 can control each of the screen regions 110a and 110b; or 110c and 110d through a comparative analysis of the obtained calibration information and the optimized calibration information.

As discussed above, if the display panel 110 is divided into a plurality of screen regions 110a and 110b; or 110c and 110d, the controller 150 can control the calibration sensor 140 so that each of the screen regions 110a and 110b; or 110c and 110d is calibrated. Accordingly, optimized visual information can be provided for each of the divided screen regions 110a and 110b; or 110c and 110d.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An image display device comprising:
   a display panel;
   a casing to hold the display panel;
   a moving bar, provided at the casing, the moving bar being configured to be movable in a first direction while overlapping the display panel;
   a calibration sensor, at the moving bar, to be movable in a second direction perpendicular to the first direction, the calibration sensor to obtain calibration information related to the display panel;
   a controller to control the display panel based on the obtained calibration information; and
   a screw device, having a thread, at one side of the casing, and the screw device to extend along the side of the casing, and
   wherein the moving bar to move in the first direction based on rotation of the screw device.

2. The image display device of claim 1, wherein the moving bar is configured to be held in a holder portion at one side of the display panel, wherein:
   the holder portion is at a lower end portion of the display panel, and
   the moving bar is configured to be movable from the lower end portion of the display panel to an upper end portion of the display panel.

3. The image display device of claim 1, wherein the calibration sensor is configured to face the display panel, and the image display device further comprises:
   a shielding wall, on the moving bar, to protrude toward the display panel and shield ambient light when the calibration sensor obtains the calibration information.

4. The image display, device of claim 3, wherein the shielding wall is provided along a circumference of the moving bar, and the shielding wall to surround a portion of the calibration sensor.

5. The image display device of claim 1, wherein the moving bar includes:

a screw device, having a thread, to extend in a lengthwise direction of the moving bar;
a driving unit to rotate the screw device; and
a moving member to support the calibration sensor, and the moving member to move in the second direction based on rotation of the screw device.

6. The image display device of claim 1, wherein:
the display panel is separated into a plurality of screen regions to output different information, and
the controller to control a position of the calibration sensor and to obtain calibration information related to each of the screen regions of the display panel.

7. The image display device of claim 6, wherein the controller controls the position of the calibration sensor such that the calibration sensor is positioned sequentially in the separated regions.

8. The image display device of claim 6, wherein the controller to perform a calculation at a central area of each of the screen regions, and the controller to provide the calibration sensor at the central area of each of the screen regions.

9. The image display device of claim 6, wherein when another screen region is provided within one of the screen regions, and the controller is configured to:
separate the remainder of the screen region, excluding the another screen region, into a plurality of sub regions,
perform a calculation at a central area of one of the separated sub regions, and
provide the calibration sensor at the central area.

10. The image display device of claim 1, further comprising a memory unit to store calibration information for each screen mode, and
the controller controls the display panel based on a comparative analysis of the obtained calibration information and the stored calibration information.

11. The image display device of claim 10, wherein the stored calibration information includes color temperature information and gamma value information.

12. An image display device comprising:
a display panel;
a casing to accommodate the display panel;
a moving bar, provided at the casing, and the moving bar to be movable in a first direction;
a calibration sensor, provided at the moving bar to face the display panel, to obtain calibration information related to the display panel, the calibration sensor to be movable in a second direction that is transverse to the first direction, the calibration information including one of color, brightness and saturation of the display panel;
a controller to adjust a characteristic of the display panel based on the obtained calibration information; and
a screw, having a thread, on one side of the casing, the screw to extend along the side of the casing,
wherein the moving bar to move in the first direction based on rotation of the screw.

13. The image display device of claim 12, further comprising:
a shielding wall formed at the moving bar to shield ambient light.

14. The image display device of claim 12, wherein:
the display panel is separated into a plurality of screen regions to output different information, and
the controller to control a position of the calibration sensor and to obtain calibration information related to each of the screen regions of the display panel.

15. The image display device of claim 14, wherein the controller to provide a calculation at a central area of each of the screen regions, and the controller to provide the calibration sensor at the central area of each of the screen regions.

16. The image display device of claim 12, further comprising a memory unit to store calibration information for each screen mode, and
the controller controls the display panel based on a comparative analysis of the obtained calibration information and the calibration information.

17. The image display device of claim 16, wherein the calibration information includes color temperature information and gamma value information.

18. An image display device comprising:
a display panel;
a casing to accommodate the display panel;
a moving bar, provided at the casing, and the moving bar to be movable in a first direction;
a calibration sensor, provided at the moving bar to face the display panel, to obtain calibration information related to the display panel, the calibration sensor to be movable in a second direction that is transverse to the first direction, the calibration information including one of color, brightness and saturation of the display panel;
a controller to adjust a characteristic of the display panel based on the obtained calibration information, wherein the moving bar includes:
a screw, having a thread, to extend in a lengthwise direction of the moving bar;
a driving unit to rotate the screw; and
a moving member to receive the calibration sensor and to move in the second direction based on rotation of the screw.

* * * * *